United States Patent [19]

Yoshida et al.

[11] Patent Number: 4,942,197

[45] Date of Patent: Jul. 17, 1990

[54] RUBBER COMPOSITION FOR TIRE TREAD

[75] Inventors: Yasunori Yoshida, Hyogo; Rinichi Nakayama; Satoshi Iwama, both of Osaka, all of Japan

[73] Assignee: Toyo Tire & Rubber Co., Ltd., Osaka, Japan

[21] Appl. No.: 200,370

[22] Filed: May 31, 1988

[30] Foreign Application Priority Data

May 28, 1987 [JP] Japan .................. 62-134020

[51] Int. Cl.$^5$ .................. C08K 3/04; C08L 9/06; C08L 15/00; B60C 1/00

[52] U.S. Cl. .................. 524/496; 524/495; 524/505; 524/526; 524/575; 525/196; 525/237; 525/332.9

[58] Field of Search .................. 524/495–496, 524/575, 505, 526; 525/196, 237, 332.9

[56] References Cited

U.S. PATENT DOCUMENTS

| | | | |
|---|---|---|---|
| 4,383,085 | 5/1983 | Fujimaki et al. | 525/196 |
| 4,548,980 | 10/1985 | Nagata et al. | 524/496 |
| 4,550,135 | 10/1985 | Iwama et al. | 524/496 |
| 4,732,927 | 3/1988 | Ida et al. | 524/496 |
| 4,742,124 | 5/1988 | Tsutsumi et al. | 525/332.2 |

FOREIGN PATENT DOCUMENTS

| | | |
|---|---|---|
| 60-26044 | 2/1985 | Japan . |
| 60-26045 | 2/1985 | Japan . |
| 60-255838 | 12/1985 | Japan . |
| 60-14214 | 1/1986 | Japan . |

OTHER PUBLICATIONS

P. Luijk, "The Versatility of the Lithium–Alkyl–Initiated Copolymerisation of Styrene and Butadiene", Kautschuk+Gummi.Kunststoffe 34, Jahrgang, Nr. 3/1981, pp. 191–195.

*Primary Examiner*—Herbert J. Lilling
*Attorney, Agent, or Firm*—Wenderoth, Lind & Ponack

[57] ABSTRACT

Rubber compositions for tire treads well balanced in the performances of rolling registance, sliding coefficient of friction on wet road surfaces and wear resistance and which are superior in the processability and workability, including at least 20 parts by weight of styrene-butadiene random copolymer prepared by using an organic lithium as a polymerization catalyst and coupled with a mono- or difunctional tin compound as well as a tri- or more functional compound and having a tin content of 300 ppm or more which is bonded to the polymer and further include a carbon black having the value of $N_2$ SA/IA of 1.1 or more.

5 Claims, No Drawings

RUBBER COMPOSITION FOR TIRE TREAD

BACKGROUND OF THE INVENTION

1. Field of the Invention

This invention relates to rubber compositions for tire treads, which are well balanced in the performances of rolling resistance, sliding coefficient of friction on wet road surfaces and wear resistance.

2. Prior Art

Conventionally, for the sake of the reduction of fuel consumption, various investigations have been made in order to obtain rubber compositions for tire treads which are balanced in both performances of the rolling resistance and the sliding coefficient of friction on wet road surfaces.

For example, Japanese patent application laid open under No. 60-255838 discloses rubber compositions containing 20 wt % of conjugated diolefin-vinyl aromatic hydrocarbon random copolymer which is copolymerized using an organic lithium polyfunctional initiator and coupled using a compound containing a halogenated tin compound, wherein the content of said vinyl aromatic hydrocarbon is 3-60 wt %, the content of tin bonded to the copolymer is 400 ppm or more and the Mooney viscosity (ML1+4, 100° C.) is 20-200.

Japanese patent application laid open under No. 61-14214 discloses improved rubber polymers containing a rubbery conjugated dien compound polymer or a rubbery vinyl aromatic compound-conjugated dien compound copolymer, wherein 10 wt % or more of said polymer or copolymer is coupled using a tri- or more functional coupling agent and 20 wt % or more is added a mono- or difunctional active tin compound and 30 wt % or more of molecules have an active tin compound bonded.

Although both prior arts intend to enhance the balance in rolling resistance and wet skid performance using a copolymer coupled by a functional tin compound and defining the content of tin etc., a high level of balance has not been attained yet.

The inventors of the present invention disclose rubber compositions in Japanese patent applications laid open under No. 60-26044 and No. 60-26045 which improved the balance in the performances of rolling resistance, sliding coefficient of friction on wet road surfaces and wear resistance by compounding a specific carbon black defined by the correlation between N2 SA and IA as a reinforcement in a rubber composition which was coupled using a tin tetrachloride.

It is true that our said prior invention attained well balanced performances of rolling resistance, sliding coefficient of friction on wet road surfaces and wear resistance, but the processability and workability which are very important in tire manufacture were not fully satisfactory.

SUMMARY OF THE INVENTION

In view of the above, it is the object of the present invention to provide rubber compositions which are balanced in the performances of rolling resistance, sliding coefficient of friction on wet road surfaces and wear resistance better than the prior rubber compositions and which are also superior in the processability and workability.

In accordance with the present invention, materials of a rubber composition contain at least 20 parts by weight of styrene-butadiene random copolymer prepared by using an organic lithium as a polymerization catalyst and being coupled with a mono- or difunctional tin compound as well as tri- and more functional compound and having a tin content of 300 ppm or more bonded to the polymer and a carbon black having the value of N2 SA/IA of 1.1 or more is compounded therein.

In our prior invention, it is intended that a polymer constituent coupled with a tin tetrachloride is bonded firmly to an active point of a carbon black surface and owing to the interaction between the polymer and the carbon black the performances of rolling resistance, sliding coefficient of friction on wet road surfaces and wear resistance are well balanced. But the polymer constituent being a star shaped copolymer coupled with a tetrafunctional tin, a rubber composition obtained was relatively inferior in the processability and workability. Namely, we have found that the functionality and the amount of tin give an unexpectedly remarkable influence on the processability and workability when compounded with the specific carbon black.

In order to improve the processability and workability while attaining the well balanced performances of rolling resistance, sliding coefficient of friction on wet road surfaces and wear resistance, the present invention first employs a carbon black having the value of N2 SA/IA of 1.1 or more and further employs a coupling operation with a tri- or more functional compound as well as a mono- or difunctional tin compound and furthermore employs materials which contain at least 20 parts by weight of styrene-butadiene random copolymer having a tin content of 300 ppm or more bonded to the polymer. In other words, by using a specific carbon black and defining the amount of a specific polymer relative to the carbon black, a high level of balance in the performances and excellent processability and workability are expected in the present invention.

The copolymer in accordance with the present invention is coupled with a compound having a tri- or more functional group, such as a tin compound, silicon compound etc. as well as a mono- or difunctional tin compound. In case a tin compound is selected for a tri- or more functional compound, the tin content of 300 ppm or more mentioned above means a total tin content of a mono- or difunctional tin compound and a tri- or more functional tin compound.

When the tin content is less than 300 ppm, the rolling resistance deteriorates and the balance in the performances is injured. When the polymer content is less than 20 parts by weight, the rolling resistance is little improved. When the value of N2 SA/IA is less than 1.1, a total balance in the processability, rolling resistance, sliding coefficient of friction on wet road surfaces and wear resistance is injured. Accordingly, it is preferable that the polymer content is 20 parts by weight or more and the value of N2 SA/IA is 1.1 or more.

Examples of chemical compounds having tri- or more functional group include tin compounds, silicon compound and diester dicarboxylic acids such as tin tetrachloride, silicon tetrachloride, butyltin trichloride, tetramethoxy tin, ethylene bistrichlorosilan, phenyltin trichloride, methyltin trichloride, diethyl adipate, etc.

Examples of tin compounds having a mono- or difunctional group include dimethyltin dichloride, dibutyltin dichloride, tributyltin chloride, triphenyltin chloride, diphenyltin dichloride, trimethyltin chloride etc.

The rubber composition comprising the specific polymer constituents and the specific carbon black as mentioned above exhibits an excellent balance in the performances of rolling resistance, sliding coefficient of friction on wet road surfaces and wear resistance better than the prior rubber compositions and are also superior in the processability and workability which is very important in tire manufacture.

All of the constituents were mixed homogeneously using a Banbury mixer to obtain rubber compositions.

Said polymer was prepared by carrying the polymerization of styrene and butadien at a comparatively low temperature in an inert solvent such as normal hexane, cyclohexane etc. using a butyllithium catalyst and adding tetrahydrofuran as a randomizer and by reacting with a coupling agent, drying and refining.

TABLE 1

| Polymer | A | B | C | D | E | F | G | H |
|---|---|---|---|---|---|---|---|---|
| *P1 compound used | $SnCl_4$ | $SnCl_4$ | $SnCl_4$ | — | $SnCl_4$ | $BuSnCl_5$ | — | — |
| amount* (Phm) | 0.0244 | 0.0150 | 0.0702 | — | 0.0204 | 0.0594 | — | — |
| *P2 compound used | $(n\text{-}Bu)_3SnCl$ | $(n\text{-}Bu)_3SnCl$ | — | $(n\text{-}Bu)_3SnCl$ | $(n\text{-}Bu)_2SnCl_2$ | — | $(n\text{-}Bu)_3SnCl$ | — |
| amount* (Phm) | 0.0914 | 0.0731 | — | 0.1670 | 0.0380 | — | 0.0740 | — |
| Tin* content (ppm) | 447 | 337 | 320 | 611 | 243 | 250 | 270 | — |

*P1 : tri- or more functional compound
*P2 : mono- or difunctional compound
*amount (Phm) : amount per hundred of monomer
*Tin content : content of tin in the polymer

DETAILED DESCRIPTION OF THE INVENTION

Shown in Table 1 and Table 2 are the polymer constituents and carbon blacks to be used in the Embodiments of the present invention as well as comparison examples.

Compositions of the Embodiments as well as the comparison examples are 100 parts of polymer, 55 parts of carbon black, 20 parts of higher aromatic oil, 3 parts of zinc oxide, 2 parts of stearic acid, 1.5 parts of aging registor (N-phenyl-N(1.3-dimethyl-butyl)p-phenylendiamine), 1.5 parts of accelerator (N-cyclohexyl-2-benzothiazol-sulfenamide), 0.2 parts of accelerator (Diphenylguanidine) and 2 parts of sulfur.

TABLE 2

| Carbon black | (a) | (b) | (c) | (d) | (e) | (f) | (g) |
|---|---|---|---|---|---|---|---|
| $N_2SA$ (m$^2$/g)* | 85 | 96 | 82 | 85 | 74 | 93 | 79 |
| IA (m$^2$/mg)* | 70 | 71 | 65 | 63 | 67 | 91 | 77 |
| $N_2SA$/IA* | 1.21 | 1.35 | 1.26 | 1.35 | 1.10 | 1.02 | 1.03 |

*Evaluation of $N_2SA$(area/weight ratio) was conducted by a nitrogen absorption method in accordance with ASTM-D3037-37.
*Evaluation of iodine absorption was conducted in accordance with JIS K6221.
*A higher numerical value of $N_2SA$/IA indicates higher activity.

Rubber compositions were prepared using the polymer in Table 1 and the carbon black in Table 2 in various combinations. Shown in Table 3 is rubber and tire performances of the Embodiments in accordance with the present invention. Table 4 shows the rubber and tire performances of the comparative examples.

TABLE 3

|  | EMBODIMENTS | | | | | | |
|---|---|---|---|---|---|---|---|
|  | 1 | 2 | 3 | 4 | 5 | 6 | 7 |
| polymer | A | B | A | A | A | A | B |
| carbon black | a | a | b | c | d | e | e |
| Pico abrasion*1 | 102 | 99 | 103 | 99 | 100 | 96 | 95 |
| tire RR*2 | 81 | 86 | 88 | 80 | 81 | 81 | 85 |
| tire wet $\mu$*3 | 97 | 99 | 98 | 96 | 95 | 94 | 96 |
| Pico abrasion × wet $\mu$ / RR *4 | 122 | 114 | 115 | 119 | 117 | 111 | 107 |

TABLE 4

|  | COMPARISON EXAMPLES | | | | | | | | | | | | | | | |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 |
| Polymer | C | D | E | F | G | H | A | A | B | C | D | E | F | G | SBR 1502 | NR |
| carbon black | a | a | a | a | a | a | f | g | f | f | g | f | g | f | f | g |
| Pico abrasion*1 | 94 | 97 | 91 | 93 | 95 | 93 | 102 | 95 | 100 | 96 | 91 | 94 | 88 | 97 | 100 | 72 |
| tire RR*2 | 88 | 85 | 89 | 90 | 89 | 97 | 96 | 88 | 99 | 100 | 89 | 99 | 92 | 99 | 100 | 92 |
| tire wet $\mu$*3 | 96 | 89 | 98 | 94 | 93 | 98 | 96 | 93 | 97 | 95 | 89 | 97 | 92 | 94 | 100 | 90 |
| Pico abrasion × wet $\mu$ / RR *4 | 103 | 102 | 100 | 97 | 99 | 94 | 102 | 100 | 98 | 91 | 91 | 92 | 88 | 92 | 100 | 70 |

*1Pico abrasion: Evaluation was conducted using a Pico abrasion tester. The values are indicated in the form of an index by setting the value of comparative example 15 which employs a conventional emulsion polymerization SBR1502 to be 100. The wear resistance becomes higher as the numerical value of the index increases.
*2 & 3Tire rolling resistance & tire wet $\mu$: Tires of 175 SR 14 having tread portions made of the rubber compositions listed in the tables were prepared and the performances were evaluated. The values are indicated in the form of an index by setting the value of comparative example 15 to be 100. The smaller the value of RR is, the better the rolling resistance is. The larger the value of wet $\mu$ is, the better the sliding coefficient of friction on wet road surfaces is.
*4The numerical values indicate the values of balance. A larger numerical value indicates higher performance of balance.

As apparent from Table 3, in the rubber compositions including the specific carbon black, comparative example 1 or 2 which employed polymers coupled with either a tri- or more functional compound or mono- or difunctional compound shows little difference in the balance performance from comparative example 15 which employed a conventional emulsion polymerization SBR1502. Although there is no indication in the tables, the polymer of comparative example 1 was extremely inferior in the processability and workability.

In the rubber compositions including the polymer coupled with both a tri- or more functional compound and difunctional compound, comparative example 3 which contained a tin less than 300 ppm shows no improvement of the balance performance.

Embodiments 1 and 2 which included the specific carbon black and the polymer coupled with a tri- or more functional compound as well as a mono- or difunctional compound and containing a tin of 300 ppm or more shows a remarkable improvement of the balance performance in comparison with comparative example 15. Each of performances of Pico abrasion, tire RR and tire wet μ is also satisfactory. The processability and workability were excellent.

In case a carbon black having the value of N2 SA/IA less than 1.1 was employed, the balance performance was not improved even if the polymer having a tin content of 300 ppm or more used. For examples, comparative examples 7, 8 and 9 are such examples.

In case the specific polymer was not used, the balance performance deteriorated as shown in comparative examples 10-14. On the contrary, the balance performance became higher with the increase of the value of N2 SA/IA by the use of the rubber composition in accordance with the present invention as shown in embodiments 1-7.

The above embodiments 1-7 relate to a rubber composition containing a single polymer. Then the performances of rubber and tire were investigated using the above specific rubber composition as well as a general rubber such as NR in a blend form. Results obtained are shown in Table 5. Other constituents, the amount used and test conditions are the same as in the above embodiments. The numerical values are also indicated in the form of an index by setting the value of comparative example 15 to be 100.

specific carbon black increased said inferior tendency. Comparative example 19 having a tin content less than 300 ppm showed a great tendency of reducing the balance performance.

On the contrary, embodiments 8-10 which included the specific polymer more than 20 parts by weight showed a preferable balance performance.

Another embodiment of the present invention consists of a rubber composition prepared in accordance with the present invention containing at least 20 parts by weight of styrene-butadiene random polymer and a carbon black, together with not more than 80 parts by weight of a diene natural or synthetic rubber.

As mentioned above, when the rubber composition prepared in accordance with the present invention is used for a tread rubber, an excellent balance in the performances of rolling resistance, sliding coefficient of friction on wet road surfaces and wear resistance is obtained and further a remarkable improvement of the processability and workability is attained.

We claim:

1. Rubber compositions for tire treads including at least 20 parts by weight of styrene-butadiene random copolymer and a carbon black, said styrene-butadiene random copolymer being prepared by using an organic lithium compounds as a polymerization catalyst and being coupled with a mono- or difunctional tin compound as well as a tri- or more functional compound and having a tin content of 300 ppm or more which is bonded to the polymer, said carbon black having the value of N2 SA/IA of 1.1 or more.

2. Rubber compositions for tire treads according to claim 1, wherein said mono- or difunctional tin compound is selected from the group consisting of dimethyltin dichloride, dibutyltin dichloride, tributyltin chloride, triphenyltin chloride, diphenyltin dichloride and trimethyltin chloride.

3. Rubber compositions for tire treads according to claim 1, wherein said tri- or more functional compound is selected from the group consisting of tin tetrachloride, silicon tetrachloride, butyltin trichloride, tetramethoxy tin, ethylene bistrichlorosilan, phenyltin trichloride, methyltin trichloride, and diethyl adipate.

4. Rubber compositions for tire treads according to claim 1, wherein said styrene-butadiene random copolymer is included in the amount of 100 parts by weight.

TABLE 5

|  | EMBODIMENTS | | | COMPARATIVE EXAMPLES | | | | | |
| --- | --- | --- | --- | --- | --- | --- | --- | --- | --- |
|  | 8 | 9 | 10 | 17 | 18 | 19 | 20 | 21 | 22 |
| polymer A | 60 | 20 | — | 10 | 10 | — | — | — | — |
| (pbw) B | — | — | 20 | — | — | — | — | — | — |
| C | — | — | — | — | — | 10 | — | — | — |
| NR (pbw) | 40 | — | — | 40 | — | 40 | 100 | — | 50 |
| SBR 1502 (pbw) | — | 80 | 80 | 50 | 90 | 50 | — | 100 | 50 |
| carbon black | a | a | e | a | g | a | a | a | a |
| Pico abrasion | 95 | 100 | 99 | 92 | 92 | 87 | 76 | 98 | 85 |
| tire RR | 81 | 90 | 92 | 90 | 99 | 93 | 85 | 95 | 92 |
| tire wet μ | 96 | 98 | 99 | 96 | 96 | 97 | 92 | 99 | 95 |
| Pico abrasion × wet μ / RR | 113 | 109 | 107 | 98 | 89 | 91 | 85 | 102 | 84 |

As apparent from Table 5, comparative example 17 which did not include the specific polymer more than 20 parts by weight showed an inferior balance performance even if the specific carbon black was contained. Comparative example 18 which did not include the 5. Rubber compositions for tire treads according to claim 1, wherein said rubber compositions further contain not more than 80 parts by weight of a diene natural or synthetic rubber.

* * * * *